(12) United States Patent
Burkhardt et al.

(10) Patent No.: US 11,152,836 B2
(45) Date of Patent: Oct. 19, 2021

(54) ROTATING ELECTRIC MACHINE

(71) Applicant: VALEO SIEMENS EAUTOMOTIVE GERMANY GMBH, Erlangen (DE)

(72) Inventors: Yves Burkhardt, Erlangen (DE); Eckhard Kirchner, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/098,697

(22) PCT Filed: May 2, 2017

(86) PCT No.: PCT/EP2017/060396
§ 371 (c)(1),
(2) Date: Nov. 2, 2018

(87) PCT Pub. No.: WO2017/191124
PCT Pub. Date: Nov. 9, 2017

(65) Prior Publication Data
US 2020/0195087 A1    Jun. 18, 2020

(30) Foreign Application Priority Data
May 3, 2016    (DE) ...................... 10 2016 207 634.5

(51) Int. Cl.
*H02K 7/00*    (2006.01)
*H02K 7/08*    (2006.01)
(Continued)

(52) U.S. Cl.
CPC ............. *H02K 7/003* (2013.01); *F16D 25/06* (2013.01); *H02K 7/083* (2013.01); *H02K 7/116* (2013.01)

(58) Field of Classification Search
CPC ........ H02K 7/003; H02K 7/083; H02K 7/116; F16D 25/06
(Continued)

(56) References Cited

U.S. PATENT DOCUMENTS 3,689,787 A * 9/1972 Simon Saretzky .... H02K 37/20
310/266
4,831,301 A * 5/1989 Neumann ................ H02K 1/16
310/184
(Continued)

FOREIGN PATENT DOCUMENTS

CN    103051102 A    4/2013
DE    102007034149 A1    1/2009
(Continued)

OTHER PUBLICATIONS

PCT/ISA/210, "International Search Report for International Application No. PCT/EP2017/060396", dated Aug. 18, 2017.

*Primary Examiner* — John K Kim
(74) *Attorney, Agent, or Firm* — Manabu Kanesaka

(57) ABSTRACT

A rotating electric machine includes a stator having a winding head at each axial end and including a rotor, which is rotatably mounted in an opening in the stator and which has a rotor shaft and a laminated rotor core. The electric machine includes a bearing unit for the rotatable mounting of the rotor shaft with respect to the laminated rotor core, a transmission unit, a coupling unit, which is designed to provide at least two coupling states for coupling the rotation of the rotor shaft to the laminated rotor core and, in at least one of the coupling states, to couple the rotor shaft to the laminated rotor core by means of the transmission unit.

9 Claims, 5 Drawing Sheets

Figure 1:
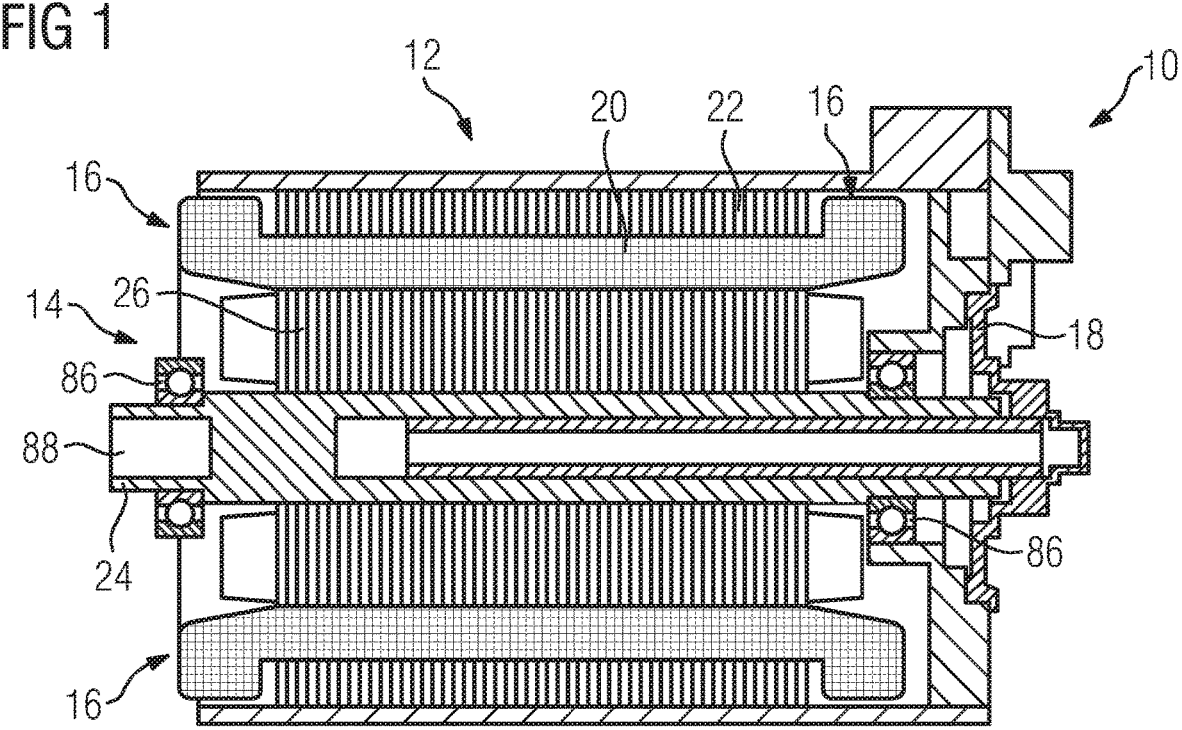

(51) Int. Cl.
*F16D 25/06* (2006.01)
*H02K 7/116* (2006.01)

(58) Field of Classification Search
USPC .......................................................... 310/83
See application file for complete search history.

(56) References Cited

U.S. PATENT DOCUMENTS

| | | | |
|---|---|---|---|
| 8,992,367 B2* | 3/2015 | Kalmbach | H02K 7/116 |
| | | | 475/150 |
| RE46,242 E* | 12/2016 | Mohr | F16H 61/32 |
| 2002/0043887 A1* | 4/2002 | Neuenschwander | |
| | | | H02K 15/024 |
| | | | 29/609 |
| 2012/0283061 A1* | 11/2012 | Karlsson | H02K 16/005 |
| | | | 475/150 |
| 2013/0140939 A1* | 6/2013 | Asaga | H02K 1/276 |
| | | | 310/216.129 |
| 2014/0117804 A1* | 5/2014 | Nestler | H02K 1/2706 |
| | | | 310/156.48 |
| 2015/0014073 A1* | 1/2015 | Murakami | B60K 6/26 |
| | | | 180/65.24 |
| 2015/0033938 A1* | 2/2015 | Erlston | F03C 1/0403 |
| | | | 91/55 |

FOREIGN PATENT DOCUMENTS

| | | |
|---|---|---|
| EP | 0 140 288 A1 | 5/1985 |
| WO | 2011/065888 A1 | 6/2011 |

\* cited by examiner

ROTATING ELECTRIC MACHINE

RELATED APPLICATIONS

The present application is National Phase of International Application No. PCT/EP2017/060396 filed May 2, 2017, and claims priority from German Application No. 10 2016 207 634.5, filed May 3, 2016, the disclosure of which is hereby incorporated by reference herein in its entirety.

The present invention relates to a rotating electric machine comprising a stator having a winding head at each axial end and comprising a rotor, which is rotatably mounted in an opening in the stator and which has a rotor shaft and a laminated rotor core. The invention additionally relates to a rotor for a rotating electric machine.

Generic electric machines and stators for same are known in principle in the prior art, and there is thus no need to provide separate written evidence of this. In a rotating electric machine there is generally a stationary part provided as stator, which usually provides a substantially circular opening for receiving a moving part formed as a rotor. The rotor is mounted rotatably in the opening, wherein an air gap is formed between the rotor and the stator.

A rotating electric machine is a device that converts electrical energy into mechanical energy, in particular movement energy (motor operation) and/or that converts mechanical energy into electrical energy (generator operation). The movement is generally a rotary movement which is performed by the rotor. The stator is arranged non-rotatably, in contrast to the rotor, in other words a rotary movement is a rotary movement of the rotor relative to the stator.

The stator and the rotor are interconnected by means of a magnetic flux, whereby the force effect, specifically the torque, that drives the rotor in rotation relative to the stator is generated in motor operation and mechanical energy supplied to the rotor in the form of a rotary movement is converted into electrical energy in generator operation. For this purpose the stator and the rotor each have a winding through which an electric current can flow. Winding heads are formed at axial ends of the stator and/or optionally of the rotor so as to be able to form the winding in a predefined manner. The winding in the stator or in the rotor can also be formed or supplemented by a permanent magnet.

Rotating electric machines of the generic kind are for example rotary field machines, which are connected to a multiphase, in particular three-phase, AC voltage grid, such as asynchronous machines, synchronous machines, synchronous machines with damper cage or the like, or also DC machines, such as shunt-wound machines or series-wound machines, or the like.

Rotating electric machines are used inter alia in electrically driven vehicles, such as electric vehicles, hybrid vehicles, or the like. Although electric drives have proven their worth in the field of motor vehicles, it has been found to be advantageous to couple the rotating electric machine by means of a transmission to driven wheels of the motor vehicle, in particular for electric drives in motor vehicles which can cover greater distances purely electrically. Various functions can be provided by means of the transmission which make it possible to achieve a high acceleration in a first gear and a high final speed in another gear. It is known for this purpose to use manually actuated variable transmissions or also automatic transmissions known from the field of internal combustion engines. It is thus possible, also for electrically driven motor vehicles, in particular in the field of passenger motor vehicles, to reach speeds in a range of from approximately 160 to approximately 200 km/h. Higher speeds for example up to 250 km/h can also be achieved.

In a field of use of this kind, the use of a transmission is generally necessary so as to be able to achieve the desired provision of power, even if the rotating electric machine can cover a much greater rotary speed range than is possible with an internal combustion engine.

The object of the invention is to develop a generic rotating electric machine and a rotor for same in such a way that a wide rotary speed range can be achieved with low outlay, in particular for use in electrically driven motor vehicles.

A rotating electric machine and a rotor according to the independent claims are proposed with the invention as a solution.

Further advantageous embodiments will become clear on the basis of features of the dependent claims.

In respect of a generic rotating electric machine it is proposed in particular that the rotating electric machine comprises a bearing unit for the rotatable mounting of the rotor shaft with respect to the laminated rotor core, a transmission unit, and a coupling unit, which is designed to provide at least two coupling states for coupling the rotation of the rotor shaft to the laminated rotor core and, in at least one of the coupling states, to couple the rotor shaft to the laminated rotor core by means of the transmission unit.

In respect of the rotor, it is proposed, in particular for a generic rotor, that the bearing unit, the transmission unit, the coupling unit and/or a fluidic drive unit are/is formed in one piece with the rotor.

The invention makes it possible, with the rotating electric machine, to also simultaneously provide a transmission function making it possible to provide at least two different gears. This is achieved by the invention in that the rotation of the rotor shaft is decoupled from the laminated core. The invention achieves the decoupling in that the bearing unit is provided, which makes it possible to mount the rotor shaft rotatably relative to the laminated rotor core. For this purpose, it can be provided that the bearing unit is arranged between the rotor shaft and the laminated rotor core and for example provides rolling elements suitable for this purpose. For example, it can be provided that the rolling elements are provided in the form of needle rollers or the like. In addition, a plain bearing can of course also be provided so as to be able to provide the desired mounting.

The bearing unit preferably extends over a large axial portion of the rotor, in particular over the entire extent of the laminated rotor core. However, it can also be provided in addition that a plurality of rolling element bearings is provided, which are arranged axially distanced between the laminated rotor core and the rotor shaft. Furthermore, it is of course possible that the rotor shaft and the laminated rotor core are mounted separately, for example by means of bearing plates, which are connected either to a base and/or to a housing of the rotating electric machine. The transmission unit preferably comprises mechanical elements which make it possible to provide a rotary speed transmission or torque transmission between an input shaft and an output shaft of the transmission unit. The transmission unit for this purpose preferably comprises gearwheels meshing with one another, the rotation of which can be coupled or is coupled on the one hand to the laminated rotor core and on the other hand to the rotor shaft.

The coupling is realised by means of the coupling unit, which has at least two coupling states. In a first coupling state the rotor shaft can be coupled to the laminated rotor core via the transmission unit. By means of the interpositioning of the transmission unit, the rotor shaft has a rotary speed different from that of the laminated rotor core. The connection in respect of rotation is achieved here by the transmission unit. In addition, the transmission unit can also comprise two output shafts, which can be coupled by means of the coupling unit to the rotor shaft and which can provide different rotary speeds from one another. Said output shafts preferably can be coupled in alternation, such that the rotor shaft is always coupled only to a single one of the output shafts of the transmission unit.

For the purpose of the rotational coupling, the coupling unit for example can comprise frictional or also form-fitting coupling elements. The use of frictional coupling elements which make it possible to achieve power switching has proven to be particularly advantageous. Different effects can be achieved hereby, wherein for example in a first gear a high acceleration can be achieved and in at least one second gear a high end speed can be achieved. It is possible here to switch between the gears preferably without significant reduction of the tractive force.

By means of the integration of a preferably power shiftable, at least two-gear transmission in the rotating electric machine, a simple and economical embodiment of a rotating electric machine for any drive purpose can be achieved. In particular, the rotating electric machine of the invention can be combined in a simple way with pre-existing transmissions in known vehicle constructions.

The invention is not limited, however, to the use of rotating electric machines in electrically driven motor vehicles. The rotating electric machine of the invention can also be used in principle in a machine tool, in domestic appliances having electric drives, in robots, in particular in a production area, in conveyor belts, printers and/or the like. By means of the invention it is possible in a simple way to equip the rotating electric machine in a manner integrated with a transmission having at least two gears. The flexibility in the field of electric drives is thus further increased. By means of the invention it is not only possible to reduce the outlay for transmissions, but it is even possible for external transmissions to be spared completely.

In accordance with an advantageous embodiment it is proposed that the coupling unit is designed in one of the coupling states for direct coupling of the rotation of the rotor shaft to the laminated rotor core. In this coupling state it is preferably provided that the rotor shaft rotates at the same rotary speed with the laminated rotor core. For this purpose it can be provided that the coupling unit is designed such that it couples the rotor shaft directly to the laminated rotor core, more specifically in a gearless manner, that is to say without interpositioning of the transmission unit. The transmission unit can thus be further simplified. In this case it merely needs to be operationally ready and designed for one of the two coupling states. By means of the direct coupling of the rotation of the rotor shaft to the laminated rotor core, a first gear of the rotating electric machine can be provided in a simple way. For this purpose it can be provided that the coupling unit provides a frictional coupling element, which for example couples the laminated rotor core frictionally at one of the end faces thereof, such that the coupling in respect of rotation between the rotor shaft and the laminated rotor core is produced. Of course, it can also be provided that a claw coupling unit is provided in order to realise this coupling. Further combinations and embodiments of the coupling unit can be provided at this juncture.

It is proposed in accordance with a further embodiment that the coupling unit is designed to automatically assume a predefined one of the coupling states. Here, the term automatically means in particular that there is no need to supply actuation energy externally. The coupling state without supply of energy is preferably held automatically. A supply of energy is particularly preferably necessary only in order to change from one coupling state into another coupling state. The coupling unit for this purpose can be prestressed to assume the predefined coupling state. This can be achieved for example by means of a resilient element, in particular a spring element. This embodiment has proven to be advantageous insofar as a coupled state between the rotor shaft and the laminated rotor core can be provided even in impaired states of the coupling unit or an actuation device for actuating the coupling unit, such that a drive function can be provided in any case. The reliability in respect of the rotating electric machine can be further improved hereby.

An advantageous embodiment of the invention provides that the coupling unit is designed to assume the coupling states to be assumed automatically depending on the direction of rotation of the laminated core. For example, it can thus be provided that the coupling state to be assumed automatically is realised by means of a freewheel unit, such that coupling occurs only in a single direction of rotation of the laminated rotor core. By contrast, in the other direction of rotation of the laminated rotor core the rotor shaft is decoupled hereby. In this case it can be coupled in the other of the two coupling states via the transmission.

The coupling unit has at least two coupling states. However, it can also have more coupling states, in particular if the transmission unit is designed to be able to provide a corresponding number of gears.

The transmission unit can particularly advantageously comprise a planetary gearing. By means of the planetary gearing it is possible in a simple way to provide a transmission with a high load-bearing capacity, with which the desired transmission function can be realised. At the same time, the use of a planetary gearing enables a number of different transmission ratios, such that the flexibility in respect of the provision of different gears is increased. For example, it can thus be provided that the laminated rotor core is connected to a ring gear of the planetary gearing, whereas the rotation of a planet carrier of the planetary gearing is connected to the rotor shaft. A sun of the planetary gearing is preferably connectable via the coupling unit to a non-rotating machine part of the rotating electric machine. By coupling the sun to the non-rotating machine part, the sun can be rotationally fixed in the coupled state, such that a rotary drive function relative to the rotor shaft can be achieved by means of the planet carrier by the peripheral laminated rotor core and the corresponding drive of the ring gear brought about hereby, wherein here an appropriate transmission ratio can be provided. If, by contrast, the laminated rotor core in the other coupling state is coupled directly to the rotor shaft, the coupling of the sun to the non-rotatable machine part is cancelled in this state, such that the planetary gearing does not bring about a coupling function between the laminated rotor core and the rotor shaft. In this way, a reliable realisation of a transmission function in the rotating electric machine can be achieved with few components. Depending on the requirements, it can of course also be provided that the rotation of the rotor shaft is connected to the ring gear, and the rotation of the laminated rotor core is connected to the planet carrier. In this case another transmission range in relation to the transmission ratio which can be realised with the planetary gearing is provided.

It is also proposed with the invention that the transmission unit and/or the coupling unit are/is arranged at least in part in a region extending between the rotor shaft and at least one of the winding heads. This makes it possible to integrate the coupling unit and/or the transmission unit at least in part in the rotating electric machine and to thus provide a unit that can be handled individually. In particular if the coupling unit and/or the transmission unit are arranged completely in this region, a very compact design can be achieved, such that a provided housing or also other machine parts of the rotating electric machine can largely still be used. The cost of providing the transmission function in the rotating electric machine can thus be further reduced. In particular, the invention can in this way be retrofitted in a simple manner in existing design concepts for rotating electric machines.

A further embodiment of the invention proposes that the coupling unit comprises an actuator, which is arranged in the rotor shaft and is mounted displaceably in an axial direction of the rotor shaft, for actuating the coupling unit. The actuator by way of example can comprise a rod, which is arranged in an axial bore of the rotor shaft. The actuator can be driven by means of a drive unit which is preferably likewise arranged in a manner integrated in the rotor. However, it can alternatively also be arranged externally of the rotor at least in part. However, it is preferably part of the rotating electric machine. The actuator acts in particular on the coupling elements of the coupling unit by means of which the at least two coupling states can be realised. It can thus be provided that with a frictional coupling element a displacement in an axial direction is made possible, for example in order to couple the rotor shaft at the end face directly to the laminated rotor core by means of the coupling element. The same can of course also be provided for a coupling element by means of which the transmission unit can be interpositioned between the rotor shaft and the laminated rotor core. This makes it possible to realise the transmission function and the coupling function in a simple way.

It has proven to be particularly advantageous if the coupling function is provided at both end-face ends of the rotor. Good utilisation of the space in the region of the winding heads can thus be achieved, and therefore a high integration density can be attained. For this purpose, an axially displaceably mounted laminated core can be provided, for example. This can be achieved by an axially displaceable laminated core carrier unit.

A further embodiment of the invention provides that the rotating electric machine comprises a fluidic drive unit for driving the actuator. The fluidic drive unit for example can be a pneumatic or also a hydraulic drive unit. The use of a hydraulic drive unit is particularly advantageously suitable, in particular if the rotating electric machine already comprises liquid cooling. In this way, a drive function for the coupling unit and optionally also for the transmission unit, for example in order to realise a gear change or the like, can be achieved by few additional elements.

The fluidic drive unit preferably comprises a fluid pump of which the rotation can be coupled to an electric motor. This makes it possible to provide the function of the drive unit independently of operation of the rotating electric machine. This also makes it possible to provide a separate fluid circuit for the drive unit, such that suitable fluid properties, such as pressure, fluid quantity and/or the like, can be provided for the drive unit. A particularly favourable drive function can thus be achieved for the coupling unit and optionally also for the transmission unit. The fluid pump, in the case of a hydraulic drive unit, is preferably a liquid pump, for example a vane pump, a gear pump, a radial pump and/or the like. In the case of a pneumatic drive unit it is preferably a gas pump, in particular an air pump of the compressor kind or the like.

It is also proposed that the fluidic drive unit is designed to decouple the rotation of the fluid pump from the electric motor in the automatically assumed coupling state. As a result, energy for the drive unit then only needs to be provided when also required by the coupling state to be assumed by the coupling unit. If, for example, a coupling state is assumed automatically by the coupling unit, further provision of energy in order to hold this coupling state is no longer necessary. Further driving of the fluid pump can therefore be spared. On the whole, a more efficient operation of the rotating electric machine can thus be achieved. The decoupling in respect of rotation can be implemented for example in that the rotation of the fluid pump is coupled to the electric motor via a freewheel. The fluid pump is thus driven merely when the electric motor rotates in the corresponding coupling direction of rotation. If, by contrast, the electric motor rotates in the opposite direction of rotation, the freewheel decouples the electric motor from the fluid pump. The desired coupling function can thus be realised in a simple way.

A development proposes that the fluidic drive unit is designed to operate the fluid pump exclusively during actuation of the coupling unit. In this development the fluid pump needs to be actuated only when the coupling states of the coupling unit are changed. This development can be provided particularly advantageously when a fluid supply is provided independently of a cooling and/or lubricating function. For this purpose, the fluid pump can be connected to the electric motor via a freewheel, such that a coupling of the fluid pump can be achieved by means of operation of the electric motor in a particular direction of rotation.

The embodiments, effects and advantages described for the rotating electric machine are of course also achievable with the rotor for the rotating electric machine.

In addition, in respect of the rotor it is proposed with the invention that the bearing unit, the transmission unit, the coupling unit and/or the fluidic drive unit are formed in one piece with the rotor. This makes it possible to provide the rotor as a unit that can be handled individually. In addition, a high integration density can be achieved. This has proven to be particularly advantageous for the case in which an existing stator can be used in order to realise the invention. Thus, no changes need to be made to the stator in order to integrate the invention in the rotating electric machine. This facilitates retrofitting of the invention in existing design concepts for rotating electric machines.

Further advantages and features can be inferred from the following description of exemplary embodiments. Like reference signs denote like features and functions in the drawings. The exemplary embodiments serve merely to explain the invention and are not intended to be limiting.

Figure 2:
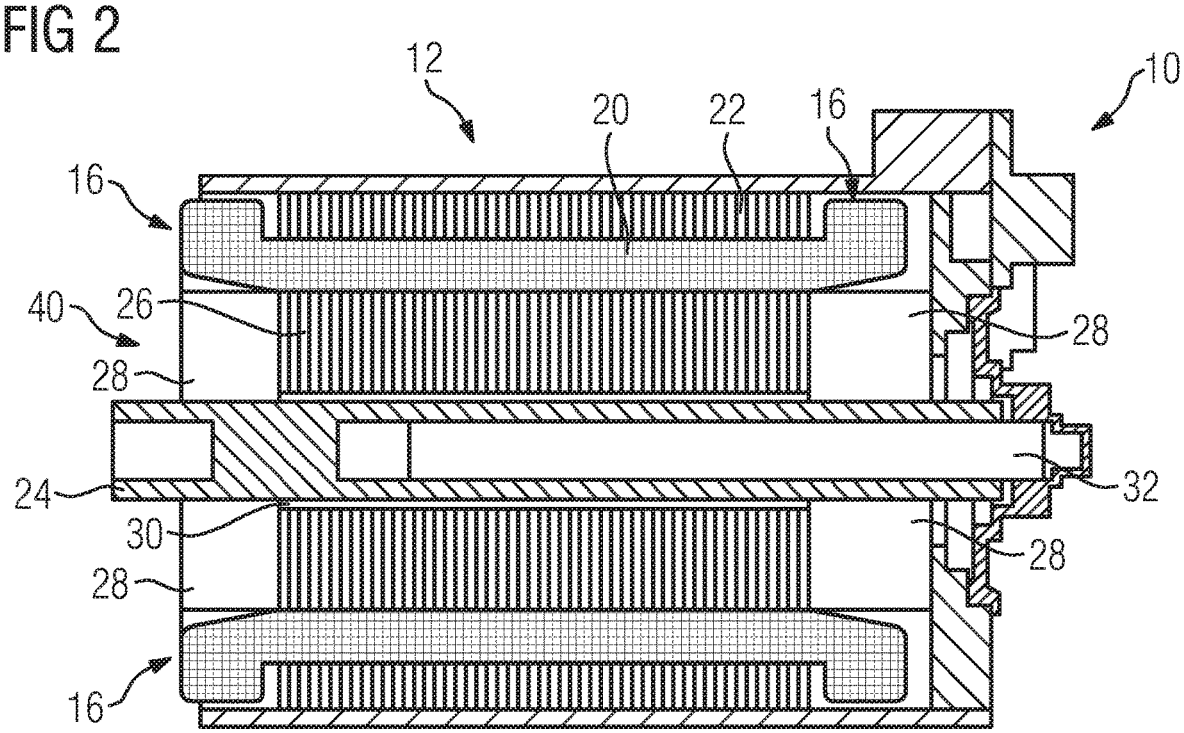
Figure 3:
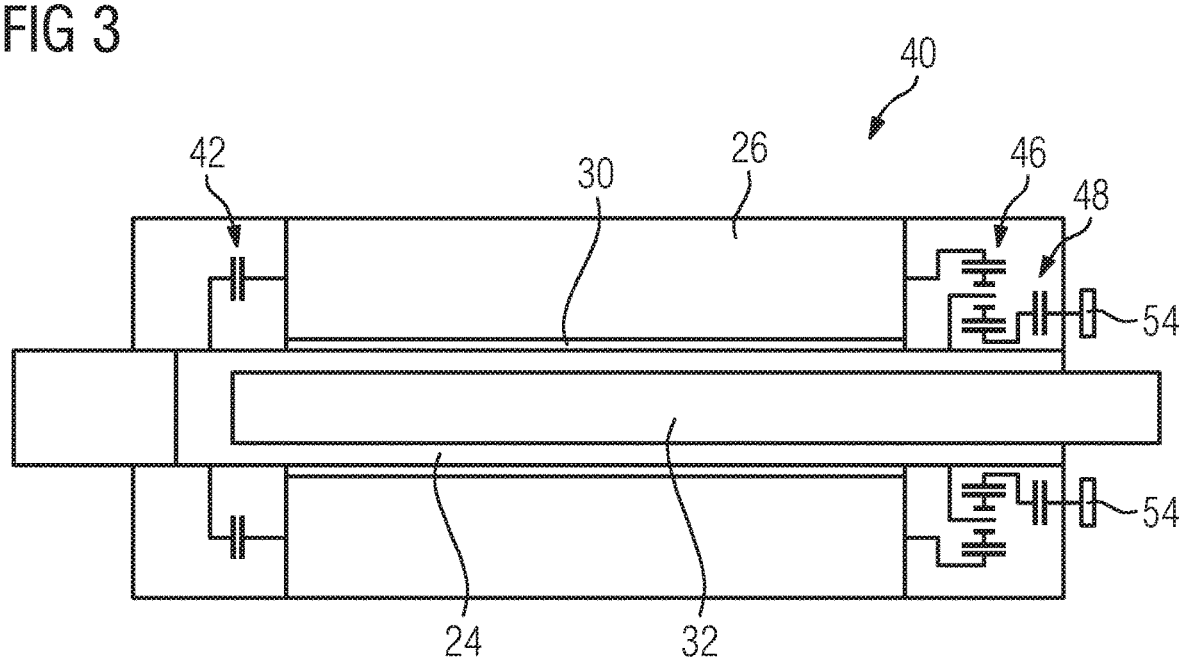
Figure 4:
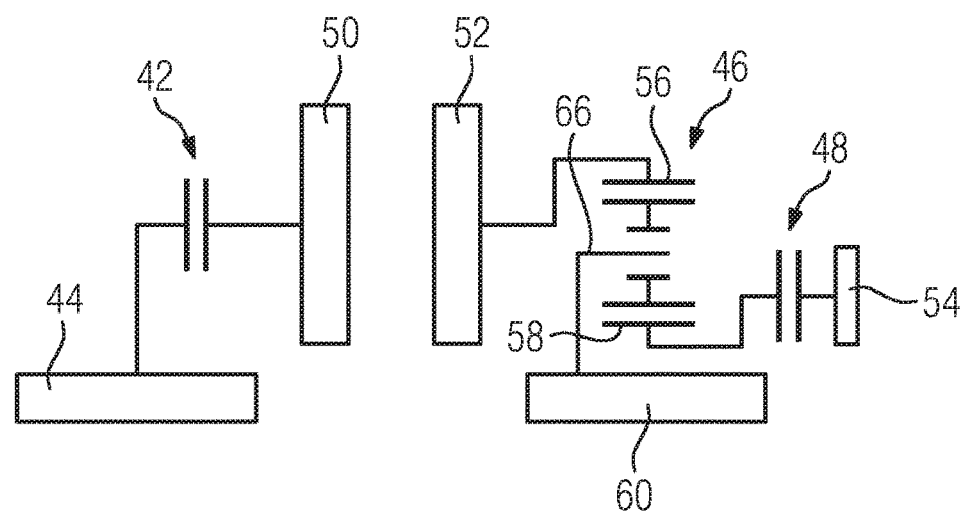
Figure 5:
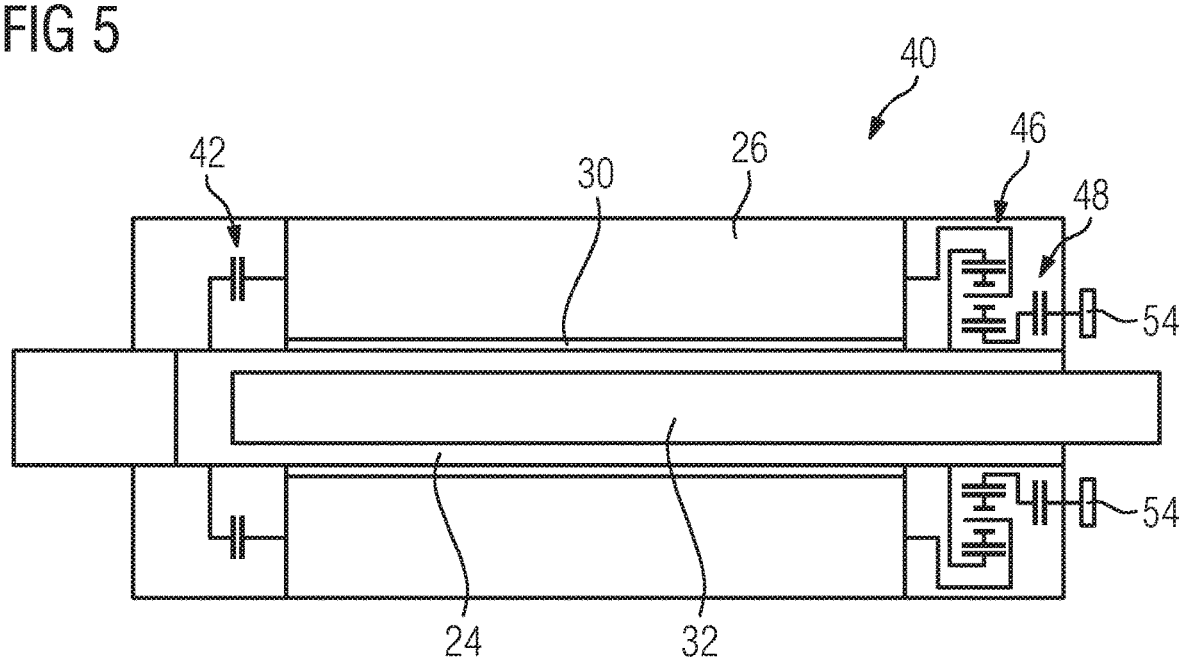
Figure 6:
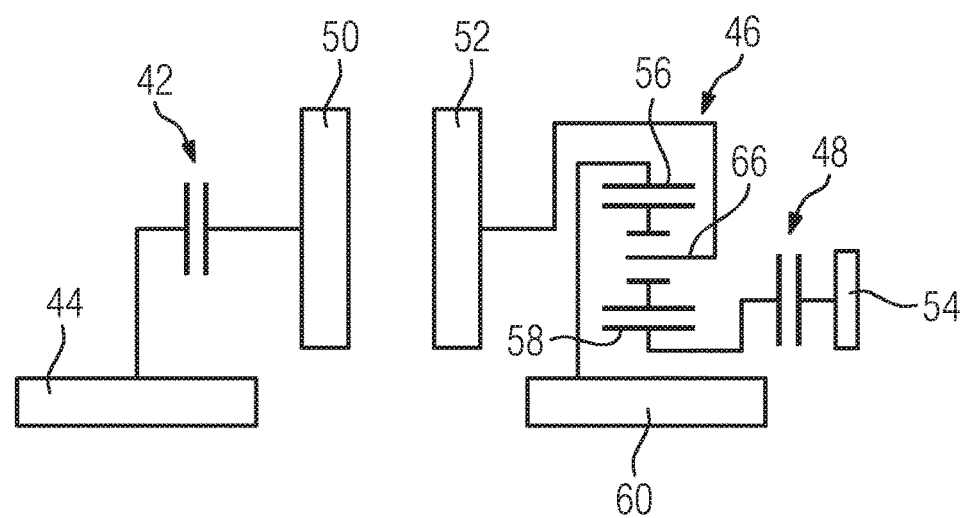
Figure 7:
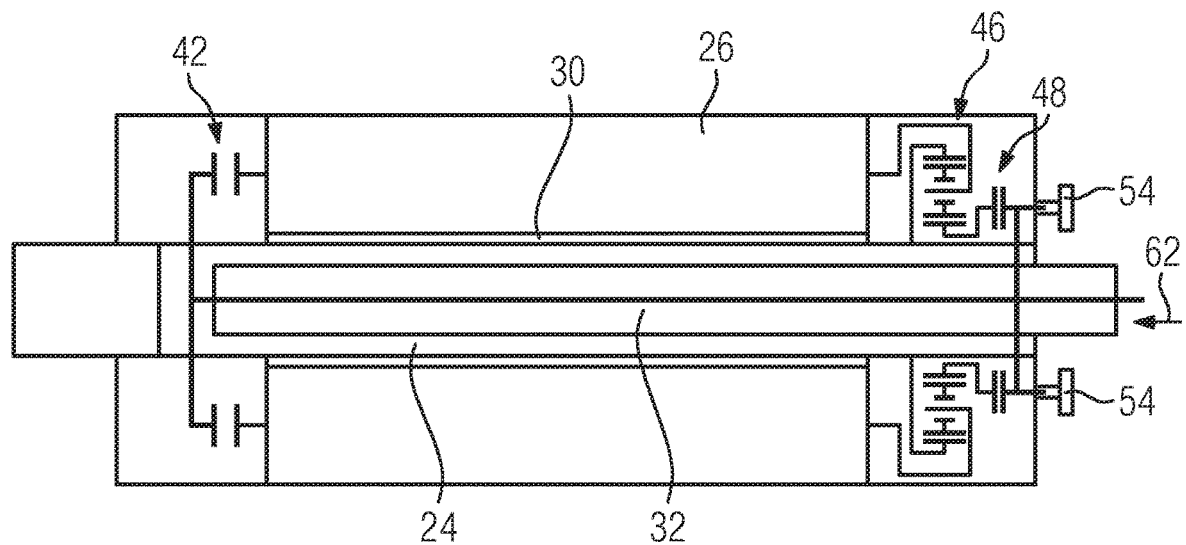
Figure 8:
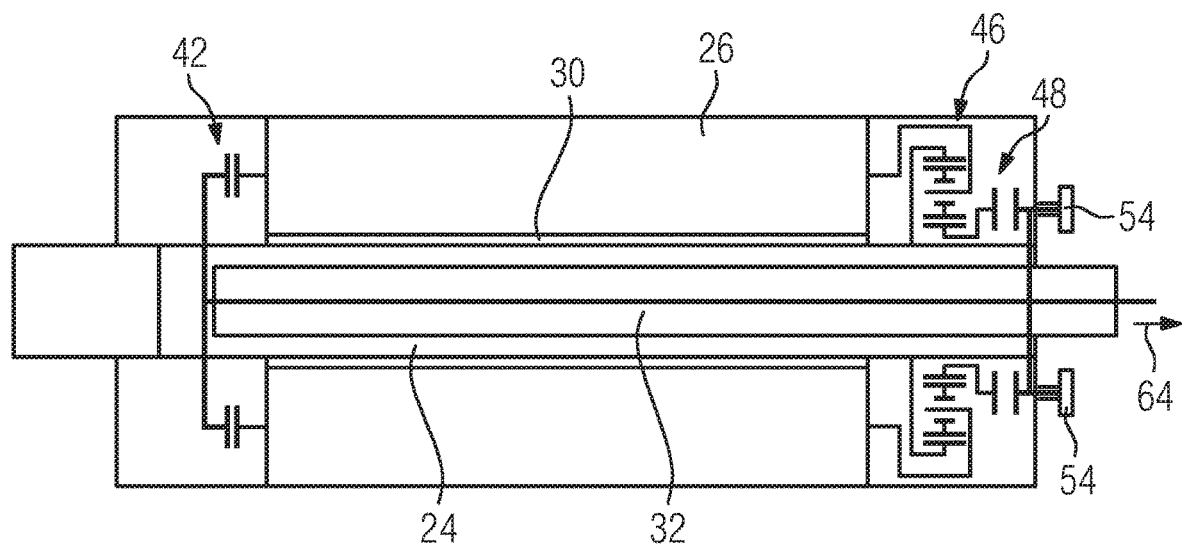
Figure 9:
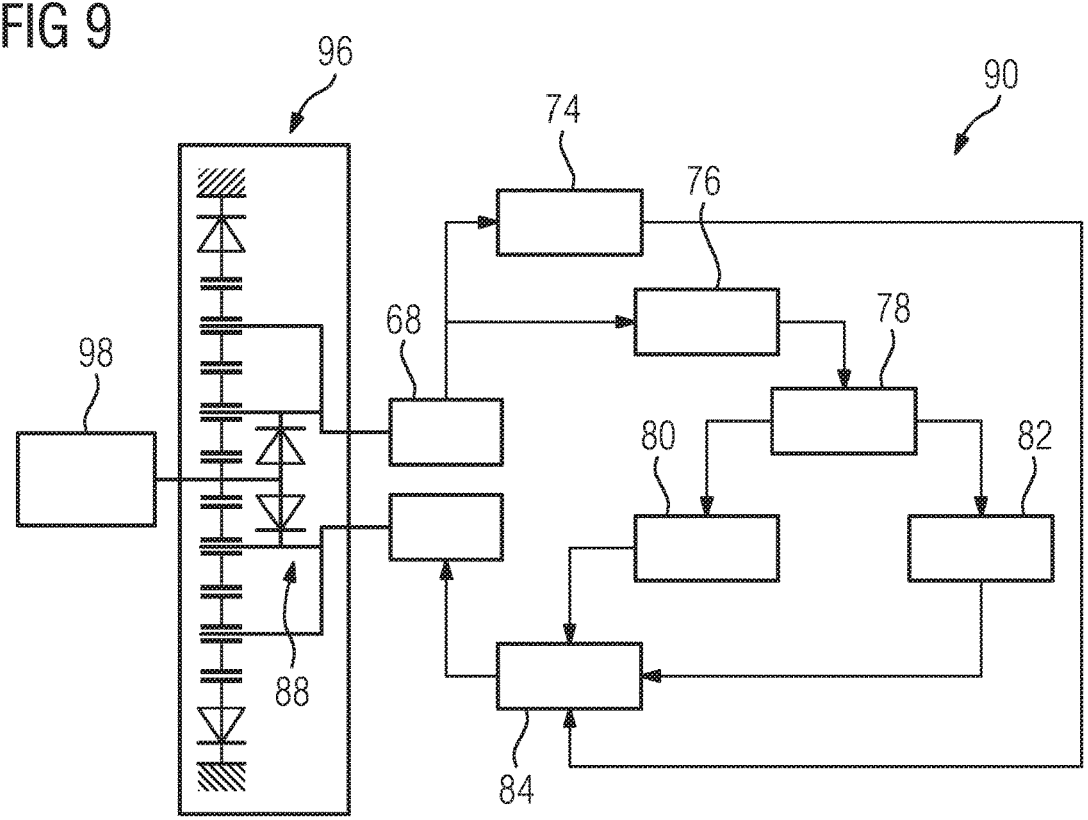
Figure 10:
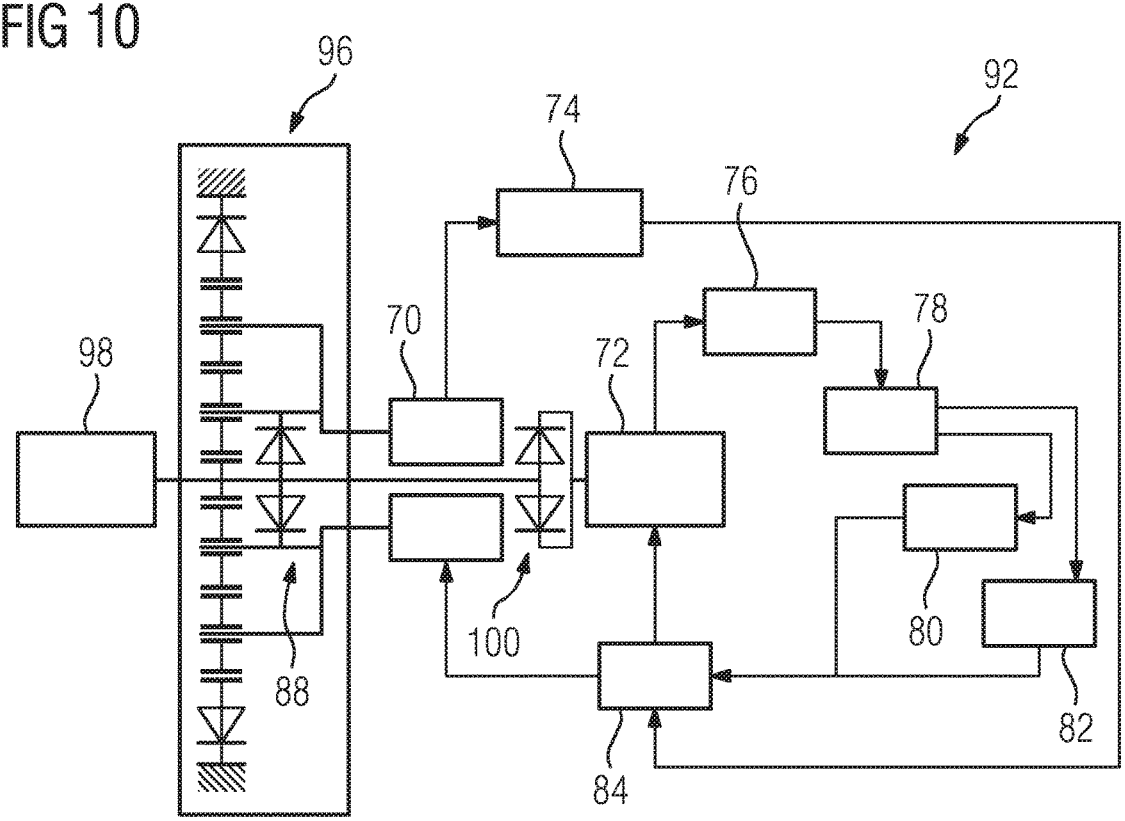

In the drawings:

FIG. 1 shows schematically a sectional view through a rotating electric machine, FIG. 2 shows a schematic depiction of the rotating electric machine according to FIG. 1 with installation spaces shown for a transmission unit and a coupling unit according to the invention, FIG. 3 shows a schematic functional view of a first embodiment of a rotor according to the invention for a rotating electric machine according to FIG. 1, FIG. 4 shows a schematic functional depiction of the coupling unit and the transmission unit according to FIG. 3, FIG. 5 shows a schematic functional view of a second embodiment of a rotor according to the invention for the rotating electric machine according to FIG. 1, FIG. 6 shows a schematic functional depiction of the coupling unit and of the transmission unit according to FIG. 5, FIG. 7 shows a schematic depiction of a first coupling state of the coupling unit of the rotor according to FIG. 5, FIG. 8 shows a schematic depiction of a second coupling state of the coupling unit of the rotor according to FIG. 5, FIG. 9 shows a schematic circuit diagram of a first embodiment for a hydraulic drive unit for actuating the coupling unit, and FIG. 10 shows a schematic circuit diagram of a second embodiment for a hydraulic drive unit for actuating the coupling unit.

FIG. 1 in a schematic sectional view shows a rotating electric machine 10 with a stator 12, which has a winding 20 and a laminated stator core 22. A winding head 16 of the winding 20 is formed at each axial end of the stator 12. A rotor 14 is mounted rotatably in a substantially circular opening in the stator 12. The rotor 14 comprises a rotor shaft 24 and a laminated rotor core 26. Bearing plates 18 are arranged at each axial end of the rotating electric machine 10, with merely the right-hand bearing plate being shown in FIG. 1. Rolling bearings 86 are positioned on the bearing plates 18 and secure the rotor shaft 24 in a rotatably mounted manner in the radial direction. Reference sign 88 denotes a mechanical connection of the rotor shaft 24, at which a device to be driven can be connected.

FIG. 2 shows a schematic sectional view of a rotating electric machine 10 according to the invention, which is based on the rotating electric machine 10 shown in FIG. 1. In contrast to the rotating electric machine according to FIG. 1, the rotating electric machine 10 according to FIG. 2 has a rotor 40 instead of the rotor 14, which rotor 40 likewise comprises a rotor shaft 24 and a laminated rotor core 26. The laminated rotor core 26, however, is mounted here rotatably relative to the rotor shaft 24 via a bearing unit 30. The bearing unit 30 in the present case comprises a plurality of rolling elements in the form of needle rollers. Reference sign 28 denotes installation spaces in which a transmission unit 46 (FIG. 3) and a coupling unit 42, 48 are arranged, as will be explained in greater detail hereinafter. The rotor shaft 24 is formed in the present case as a hollow shaft, wherein its cavity provides an installation space for an actuator 32. The further elements correspond to those already explained in relation to FIG. 1, and therefore reference is made additionally in this regard to the description of FIG. 1.

FIG. 3 shows a first embodiment for the rotor 40 according to FIG. 2. It can be seen from FIG. 3 that a first coupling element 42 of the coupling unit is arranged in the left region of the rotor 40, which coupling element is formed in the present case by a friction coupling. The friction coupling 42 is designed to couple the rotation of the laminated rotor core 26 to the rotor shaft 24 in the coupled state. The first coupling element 42 can be actuated by means of the actuator 32 between a coupling and a non-coupling state.

A planetary gearing 46 as transmission unit is also shown in the right-hand region of FIG. 3. Transmission lubrication by means of oil can preferably be used simultaneously to the cooling of the electric machine 10, in particular the winding heads 16 thereof. The planetary gearing 46 further can be coupled to a non-rotating machine element 54 by means of a second coupling element 48, which likewise is formed in the present case as a friction coupling. The second coupling element 48 likewise can be switched between a first and a second coupling state, for which purpose it likewise can be actuated by means of the actuator 32.

It is provided in the present case that actuation by means of the actuator 32 provides and releases a coupling state of the coupling elements 42, 48 in alternation. The coupling elements 42, 48 are thus always in the coupling state alternately, apart from when in a transition phase.

FIG. 4 shows a schematic functional view of the coupling unit 42, 48 and of the planetary gearing 46. The friction coupling 42 is shown in the left region in FIG. 4. The friction coupling 42 is on the one hand connected to a connection element 44 for conjoint rotation, said connection element being in turn connected to the rotor shaft 24 for conjoint rotation. On the other hand, the friction coupling 42 is connected for conjoint rotation to a connection element 50, which in turn is connected for conjoint rotation to the laminated rotor core 26. In the coupling state the friction coupling 42 thus provides a rotational coupling between the connection element 44 and the connection element 50, such that the rotor shaft 24 and the laminated rotor core 26 are directly coupled to one another in respect of rotation.

In the right-hand region of FIG. 4 the planetary gearing 46 is shown in conjunction with the second coupling element, here the friction coupling 48. Here as well, a connection element 52 is connected to the laminated rotor core 26 for conjoint rotation. At the same time, the connection element 52 is connected for conjoint rotation to a ring gear 56 of the planetary gearing 46. A planet carrier 66 of the planetary gearing 46 is connected for conjoint rotation to a connection element 60, which is in turn connected for conjoint rotation to the rotor shaft 24. A sun 58 of the planetary gearing 46 is connected for conjoint rotation to one side of the friction coupling 48, whereas another side of the friction coupling 48 is connected for conjoint rotation to the machine element 54. The sun 58 in the coupled state can thus be coupled to the machine element 54 by means of the friction coupling 48, such that the sun 58 does not rotate in the coupled state of the second coupling element 48. In this state the rotary movement of the laminated core 26 transfers the rotary movement of the laminated core 26 via the ring gear 56 to the planet carrier 66, which in turn transfers its rotary movement to the rotor shaft 24 via the connection element 60. There is thus a rotary speed difference between the laminated rotor core 26 and the rotor shaft 24.

In the present embodiment the laminated rotor core 26 always has the same direction of rotation as the rotor shaft 24. Specifically, the laminated rotor core 26 is preferably coupled to the ring gear 56, and the rotor shaft 24 is coupled to the planet carrier 66, wherein the sun 58 is fixed. This is advantageous for the mounting of the rotor shaft 24, because the relative speed between the laminated rotor core 26 and the rotor shaft 24 is thus comparatively low.

In this embodiment, on account of the connection of the planetary gearing 46, the rotary speed of the rotor shaft 24 is also slower than the rotary speed of the laminated rotor core 26. The transmission ratio is thus less than 1 in the present case.

If, by contrast, the friction coupling 48 is decoupled, the sun 58 can rotate freely, such that is not possible to couple the rotation of the connection elements 52 and 60 via the planetary gearing 46.

The present embodiment is thus suitable for an electric machine 10 which is intended to produce a high torque at the time of start-up. By switching the coupling unit 42, 48, it is thus possible to switch between a synchronous state, in which the rotary speed of the laminated rotor core 26 and the rotor shaft 24 are the same, and a differential state, in which the rotary speed of the laminated rotor core 26 is greater than that of the rotor shaft 24. The difference in rotary speed is given on the basis of the design of the planetary gearing 46. Due to the embodiment in the form of a friction coupling, it is also possible to switch under load. In the present case, a 2-gear function is thus provided.

It is also clear from the drawings that the planetary gearing 46 and the coupling elements 42, 48 can be arranged substantially fully in the installation spaces 28 between the rotor shaft 24 and the winding heads 16. The invention can thus be integrated in a simple way into existing design concepts of rotating electric machines, as can be seen on the basis of FIGS. 1 and 2.

FIGS. 5 and 6 relate to a second exemplary embodiment for the rotor 40, which is based on the first exemplary embodiment according to FIGS. 3 and 4. Consequently, reference is made additionally to the descriptions in relation to FIGS. 3 and 4. In contrast to the first exemplary embodiment according to FIGS. 3 and 4, it is provided in the second exemplary embodiment according to FIGS. 5 and 6 that the planetary gearing 46 is connected differently to the rotor shaft 24 and the laminated rotor core 26. In the present case it is provided that the connection element 52 coupling the rotation of the laminated rotor core 26 to the planet carrier 66. In addition, the ring gear 56 of the planetary gearing 46 is connected for conjoint rotation to the connection element 60, which is in turn connected to the rotor shaft 24. Otherwise, the design of this exemplary embodiment in respect of the further components corresponds to that already explained in respect of FIGS. 3 and 4 in relation to the first exemplary embodiment.

The embodiment according to FIGS. 5 and 6 means that the rotor shaft 24 has a quicker rotary speed than the laminated rotor core 26. This is due to the function of the planetary gearing 46, which with this connection provides a transmission ratio of greater than 1. A high rotary speed can thus be achieved by means of the rotor shaft 24. At very high rotary speeds it can additionally be provided that the bearing unit 30 is formed as a plain bearing. However, other bearing elements can also be provided in order to mount the rotor shaft 24 rotatably relative to the laminated rotor core 26.

FIGS. 7 and 8 show two switching states of the coupling unit 42, 48 in respect of the second exemplary embodiment according to FIGS. 5 and 6. In FIG. 7 the first coupling element, specifically the friction coupling 42, is in the decoupled state on account of actuation by the actuator 32 in the axial direction 62. In this position there is thus no coupling between the laminated rotor core 26 and the rotor shaft 24. Instead, the second coupling element, specifically the friction coupling 48, is in the coupled state, such that the sun 58 is clamped via the second coupling element 48 and the machine element 54 and does not rotate. Consequently, there is a rotational coupling between the laminated rotor core 26 and the rotor shaft 24 via the planetary gearing 46, as has already been explained previously in relation to FIGS. 5 and 6. Both the first coupling element 42 and the second coupling element 48 are actuated equally by means of the actuator 32.

FIG. 8 now shows a second coupling state, in which the actuator 32 is displaced axially in the direction 64. The first coupling element 42 is thus now in the coupling state and couples the laminated rotor core 26 directly to the rotor shaft 24, such that these rotate jointly at the same rotary speed. At the same time, the second coupling element 48 is in the decoupled state, such that the sun 58 can rotate freely. Consequently, there is no coupling via the planetary gearing 46 between the rotor shaft 24 and the laminated rotor core 26.

It is thus possible to switch between the two coupling states shown in FIGS. 7 and 8 merely by axial actuation of the actuator 32. By suitable design of the coupling unit 42, 48, switching under load can be provided. This has proven to be advantageous not only with use of the rotating electric machine 10 in the case of electrically driveable motor vehicles, but also in the case of machine tools or the like in which it is important for the torque to be effective continuously to the greatest possible extent.

FIG. 9 now shows a schematic hydraulic block diagram of a first embodiment of a hydraulic drive unit 90. The drive unit 90 uses a hydraulic system which is already present in the rotating electric machine 10 and which is used to cool and lubricate the rotating electric machine 10. For this purpose, an oil pump 68 is provided as fluid pump and supplies oil to a lubricating and cooling circuit 74. The oil flowing through the lubricating and cooling circuit 74 is collected in a reservoir 84 and fed back to the oil pump 68.

An actuation circuit 76 is connected to the oil pump 68, parallel to the lubricating and cooling circuit 74. The actuation circuit 76 can be activated by means of an electric actuation signal (not shown), wherein the actuation signal in the present case has two signal states, more specifically an actuation state and a rest state. These two signal states are represented by two associated voltage levels of the actuation signal. The actuation signal can be provided by a control unit (not shown), by means of which the rotating electric machine 10 can be controlled.

The two signal states correspond to the two coupling states of the coupling unit 42, 48. The actuation circuit 76 is connected to a 1-2-way valve 78, which is in turn connected to a 1-2 piston-cylinder arrangement 80 and to a 2-1 piston-cylinder arrangement 82. Each of the two piston-cylinder arrangements 80, 82 is also connected to the reservoir 84. Pistons (not shown) of the piston-cylinder arrangements 80, 82 are mechanically connected to the actuator 32, such that the actuator 32, on account of the actuation of the piston-cylinder arrangements 80, 82, can be actuated between two end positions corresponding to the actuation positions of the coupling unit 42, 48.

It is provided in the present case that the actuation circuit 76 is activated by means of the electric actuation signal such that the oil flows through the actuation circuit 76 to the directional control valve 78. The directional control valve 78 is coupled to the piston-cylinder arrangements 80, 82 in such a way that it feeds oil to one of the piston-cylinder arrangements 80, 82, which moves the actuator 32 from a currently assumed end position into the other end position. The supply of oil causes the piston-cylinder arrangements 80, 82, which in the present case are coupled to one another, to change their positions and thus displace the actuator 32 in the corresponding direction 62, 64. In the event of subsequent actuation, the other of the piston-cylinder arrangements 80, 82 is supplied with oil, such that the actuator 32 is moved in the opposite direction. The coupling units 42, 48 are thus switched into their respective coupling states. The oil pump 68 is also coupled to the laminated rotor core 26 via a transmission unit 96. Thus, an actuation signal needs to act on the actuation circuit 76 only during a switching process.

The oil pump 68 is driven in the present case by an electric motor 98 via a transmission arrangement 96 comprising a freewheel unit 88. The electric motor 98 in the present case can be operated in its two possible directions of rotation, that is to say it can be driven in one of the two directions of rotation as necessary. A rotary speed of the electric motor 98 can be adapted by means of the transmission arrangement 96 to a rotary speed suitable for the oil pump 68. By means of the freewheel unit 88, the oil pump 68 can be driven only in a direction of rotation of the electric motor 98. By means of the preferably identical actuation state of the actuation signal, it is thus possible to switch from a currently assumed coupling state into the other coupling state to be assumed of the coupling unit 42, 48.

FIG. 10 shows a second embodiment of a fluidic drive unit 92, which is based on the embodiment of the fluidic drive unit 90. In contrast to the embodiment according to FIG. 9, the fluidic drive unit 92 in this embodiment is intended to provide an independent oil circuit for the actuation of the actuator 32. For this purpose, the fluidic drive unit, which in the present case is likewise a hydraulic drive unit 92, comprises a high-pressure oil pump 72, which is connected to the actuation circuit 76. The further elements correspond to those of the embodiments of the hydraulic drive unit 90, and therefore reference is made additionally to the descriptions provided in this regard.

The high-pressure oil pump 72 is designed for a low volume flow at a high oil pressure. It is also connected via a freewheel 100 to a low-pressure oil pump 70, which is designed to convey a large volume flow at a low oil pressure. The low-pressure oil pump 70 is connected to the electric motor 98, as already explained in relation to FIG. 9.

The present embodiment is suitable in particular for a design in which the drive of the high-pressure oil pump 72 can be activated and deactivated with the switching of the direction of rotation of the electric motor 98. The high-pressure oil pump 72 is thus activated only in one of the two directions of rotation of the laminated rotor core 26.

It is possible in principle with the invention to integrate transmission and coupling functions in a simple manner into the rotating electric machine 10. In addition, with the invention it is possible to achieve the possibility of power shifting, such that no significant tractive force interruption or tractive force reduction can be detected when shifting between gears. A large number of electric drive solutions can be realised as a result of the integration of a two-gear transmission, which in particular is capable of power shifting, in the installation space of the electric machine. An electric machine of this kind can preferably be easily combined with existing transmissions in vehicle drives so as to further increase the flexibility. It is thus possible with the invention, for example in the case of electrically driveable motor vehicles, to design the motor vehicles also for high speeds in a simple way. Here, in particular in the case of battery-fed electric vehicles, such as electric vehicles, hybrid vehicles and the like, the subjective perception of a shifting process of a stepped transmission can be influenced by the fact that the electric drive, after the shifting process, has more acceleration as a result of the drop in rotary speed when upshifting, whereas this generally decreases in a comparable internal combustion engine.

In electric vehicles or electrically driveable vehicles, the requirements on comfort during a gear shift are higher, since there are no masking noises and a rotating electric machine has good torque-speed behaviour over a very wide rotary speed range. The invention takes account of the finding that the rotating electric machine generally requires a transmission in order to reduce the advantageous rotary speed level of the rotating electric machine to a wheel rotary speed.

For a gear step of a two-gear transmission a value of approximately 1.5 can be deemed as a feasible and advantageous order of magnitude both in respect of the greatest possible rotary speed band for the embodiment of the transmission and in respect of acceptance of a reduction in tractive force during shifting. With a larger gear step, the acceptance in respect of the tractive force losses may be compromised, whereas with a smaller gear step the advantage is merely small.

For the invention it is irrelevant to distinguish between power shifting and synchronised shifting. The coupling unit can be realised by means of an appropriate actuator, as explained previously, for a variant suitable for power shifting, for example based on frictional couplings. Nevertheless, a form-fitting coupling, such as a claw coupling, can also be provided, as exists for example in unsynchronised or also synchronised form in manual transmissions or dual-clutch transmissions.

The invention in particular uses the installation space as a feature, wherein the integration of at least one gear step in the region disposed radially between the rotor shaft 24 and the winding heads 16 is provided. In the case of a power flow reduction transmission, it can be provided as possible ratios that a first gear provides drive at the ring gear 56 and output at the planet carrier 66, wherein the sun 58 is clamped. A standard ratio can thus be given by $i=1-1/i_0$, whereby approximately $i_0=-2.5$. The second gear can then be a direct gear, as has been explained in relation to the second exemplary embodiment on the basis of FIGS. 5 and 6.

An alternative for a high-speed transmission can provide that the first gear is a direct gear and a second gear provides drive at the planet carrier 66, whereas an output is provided at the ring gear 56. Here as well, the sun is again clamped. The ratio is $i=i_0/(i_0-1)$. A standard ratio can be, for example, approximately $i_0=-2.0$.

The schematic power transfer within the two-gear electric machine 10 is independent of the type of coupling and actuation thereof. The following aspects are noted by the invention:

mounting of the laminated rotor core 26 of the rotor 40 on the rotor shaft 24, wherein low-friction mounting enables a different rotary speed of the laminated rotor core 26 and of the rotor shaft 24;
  comprehensive or at least partial integration of the power-conducting or power-converting elements or units in a region radially beneath the winding heads 16 of the rotating electric machine 10;
  use of rotational direction-maintaining arrangement of a planetary gearing 46 for rotary speed variation both to a higher rotary speed and to a lower rotary speed of the rotor shaft 24;
  use of a rigid through drive as direct drive;
  comprehensive or partial integration of an actuator 32 for at least one coupling element 42, 48 in the rotor shaft 24.

Two actuators generally can be used to provide capability for power shifting, by means of which actuators two frictional couplings are actuated. Here, only one of the actuators is actuated in each of the two coupling states, whereas the other of the actuators is unactuated.

In addition, coupling units or brakes are generally embodied as "normally open" systems. With the invention, a system which uses a "normally open" coupling with only one actuator acting in the same direction can be achieved with just one single actuator. With the actuation strategy it is possible to distinguish between two states, more specifically a "natural state" and an "actuated state". Both states are designed to be stable to a small extent. The distinction is based on the fact that reaching the "actuated state" requires a higher expenditure of energy and that this only needs to be geometrically stable to a small extent, whereas the "natural state" can be achieved with lower energy use and has a wider stability range.

Natural state:
This is started in a key-off situation and is used to ensure operation even the event of failure of the actuator. A rotary speed or speed limitation may be necessary, but complete onward travel to a garage or continued operation until maintenance can be made possible.

The actuator 32 as "normally closed" system holds one of the gears, preferably the first gear, in the engaged state, more specifically independently of the embodiment. In this state there is no need for any power input in order to hold this state, because mechanical locking is present, for example by means of a detent element and/or a form fit.

Actuated state:
A metastable configuration with mechanical locking via a purely frictional engagement or frictional connection. This is construed via a "small pulse" on account of the meta-stable position, wherein an actuator force can be much lower than in the case of engagement of a gear.

The actuator holds the "normally open" position actuated at the second gear, wherein a metastable embodiment can function reliably within the scope of small disturbances even without active actuation.

A mechanically based actuator can be provided, wherein however in the present case a fluidic, in particular hydraulic, actuator is preferred. The first exemplary embodiment according to FIGS. 3 and 4 shows that it is possible to change by means of the actuator 32 between the "natural state" and the "actuated state" on the basis of an axial displacement.

In the present case the drive units 90, 92 are formed as hydraulic drive units. Thus, only one drive unit is sufficient for the electric pump 68, 98, and in addition only a simple switching valve is required in order to conduct the pressurising volume flow into the corresponding chamber of the actuation cylinder 80, 82. Here, the actuation cylinder can be geometrically resolved in respect of its design, that is to say instead of a conventional pull/push cylinder, two single cylinders acting in a manner directed in opposite directions in the form of the piston-cylinder arrangements 80, 82 can be provided.

The selection of an operating mode of the pump 68, 72 can be made via a direction of rotation of an electric drive motor 98 of the pump 68, 72 and a single, automatically acting two-gear transmission 96 of planetary design. In one direction of rotation the electric drive motor 98 drives the low-pressure oil pump 70 via a 1:1 ratio in order to lubricate and cool integrated transmission elements and the entire rotating electric machine 10 with a combined lubricating and cooling circuit 74. As a result of the two switching positions and stable design of the actuator on a small scale, there is no need for permanent cooling of the coupling elements 42, 48, and therefore a single, uncontrolled drive control unit is sufficient as pump drive.

In another direction of rotation of the electric drive motor 98, the transmission 96 can provide a rotational direction-maintaining transfer to a high rotary speed, whereby a higher oil volume flow can be provided for a period of a shifting process. A controlled pump control unit to robustly cool and actuate the actuator 32 can thus be avoided by a purely mechanical solution.

If, by contrast, the oil pressure provided by the low-pressure oil pump 70 (FIG. 9) should be insufficient for the actuation of the actuator 32, a high-pressure oil pump 72 connected in parallel can thus in turn also be driven via a single freewheel 100 in the actuation direction of rotation of the pump drive so as to provide the necessary high actuation pressure (FIG. 10).

FIG. 10 shows the schematic construction of this more complex hydraulic control unit, wherein dashed lines represent mechanical power flows and dotted lines represent hydraulic power flows.

In FIGS. 9 and 10 the "diode" symbol represents a mechanically acting freewheel 88, 100, in which a torque is transmitted only in one direction. Both in the case of the embodiment according to FIG. 9 and in the case of the embodiment according to FIG. 10, it is provided that the pumps 68, 70, 72 are always driven in the same direction of rotation in spite of a change in direction of rotation of the electric motor 98.

In accordance with the invention the hydraulic drive unit 90, 92 is based substantially on the electric motor 98, at least one pump 68, 70, 72, and the hydraulic 1-2-way valve 78. Here, the valve 78 guides the oil pressure provided by the oil pump 72 to the correct one of the piston-cylinder arrangements 80, 82 depending on the shifting process, by means of which arrangement the coupling unit 42, 48 can be actuated similarly to mechanical actuation.

The exemplary embodiments shown in the drawings serve merely to explain the invention and are non-limiting. In particular, method features can also be provided for device features.

The invention claimed is:

1. A rotating electric machine comprising:
a stator having a winding head at each axial end,
a rotor, which is rotatably mounted in an opening in the stator and which has a rotor shaft and a laminated rotor core,
a bearing unit for rotatable mounting of the rotor shaft with respect to the laminated rotor core,
a transmission unit,
a coupling unit, which is designed to provide at least two coupling states for coupling rotation of the rotor shaft to the laminated rotor core and, in at least one of the coupling states, to couple the rotor shaft to the laminated rotor core by means of the transmission unit, the coupling unit including an actuator, which is arranged in the rotor shaft and is displaceable in an axial direction of the rotor shaft, for actuating the coupling unit, and
a fluidic drive unit for driving the actuator.

2. The rotating electric machine according to claim 1, wherein the coupling unit is designed in one of the coupling states for direct rotary coupling of the rotor shaft to the laminated rotor core.

3. The rotating electric machine according to claim 1, wherein the coupling unit is designed to automatically assume a predefined one of the coupling states.

4. The rotating electric machine according to claim 3, wherein the coupling unit is designed to assume the coupling states to be assumed automatically depending on a direction of rotation of the laminated rotor core.

5. The rotating electric machine according to claim 1, wherein the transmission unit comprises a planetary gearing.

6. The rotating electric machine according to claim 1, wherein the transmission unit and/or the coupling unit are/is arranged at least in part in a region extending between the rotor shaft and at least one of the winding heads.

7. The rotating electric machine according to claim 1, wherein the fluidic drive unit comprises a fluid pump of which rotation can be coupled to an electric motor.

8. The rotating electric machine according to claim 7, wherein the fluidic drive unit is designed to decouple the rotation of the fluid pump from the electric motor in an automatically assumed coupling state.

9. The rotating electric machine according to claim 7, wherein the fluidic drive unit is designed to operate the fluid pump exclusively during actuation of the coupling unit.

* * * * *